(12) United States Patent
Jeong

(10) Patent No.: US 6,369,856 B1
(45) Date of Patent: Apr. 9, 2002

(54) SYNCHRONOUS SIGNAL DETECTION CIRCUIT AND METHOD

(75) Inventor: Tae Bo Jeong, Kyoungki-do (KR)

(73) Assignee: Hyundai DisplayTechnology Inc., Kyoungki-do (KR)

( * ) Notice: Subject to any disclaimer, the term of this patent is extended or adjusted under 35 U.S.C. 154(b) by 0 days.

(21) Appl. No.: 09/108,032

(22) Filed: Jun. 30, 1998

(30) Foreign Application Priority Data

Jun. 30, 1997 (KR) .............................. 97-30433

(51) Int. Cl.[7] .................................... H04N 5/10
(52) U.S. Cl. ........................ 348/530; 348/525
(58) Field of Search ................................. 348/525, 529, 348/530, 531, 153, 154; H04N 5/08, 5/10

(56) References Cited

U.S. PATENT DOCUMENTS 5,144,432 A  *  9/1992  Higashitsutsumi
5,189,515 A      2/1993  Chen

FOREIGN PATENT DOCUMENTS

| JP | 58-121870 | * | 7/1983 | ................. 358/154 |
| JP | 58-121871 | * | 7/1983 | ................. 348/154 |
| JP | 1-93266 | * | 4/1989 | ............ H04N/5/10 |
| JP | 2-192268 | * | 7/1990 | |

* cited by examiner

Primary Examiner—David E. Harvey
(74) Attorney, Agent, or Firm—Selitto, Behr & Kim

(57) ABSTRACT

A synchronous signal detection circuit which detect a vertical synchronous signal and a horizontal synchronous signal from composite synchronous signal, including: a reset generation means for receiving an external composite synchronous signal and an external main clock signal to generate a reset signal at falling edge of the composite synchronous signal; a counter means being reset by the reset signal received from the reset generation means and for counting the main clock signal to generate first through fourth output signals; a vertical synchronous signal detection means for receiving the second output signal of the counter means and the composite synchronous signal to detect the vertical synchronous signal of the composite synchronous signal and generating the vertical synchronous signal; and a horizontal synchronous signal detection means for receiving the third and the fourth output signals of the counter means and the reset signal of the reset generation means to detect the horizontal synchronous signal of composite synchronous signal having a period of 1 horizontal scanning interval (1H).

20 Claims, 4 Drawing Sheets

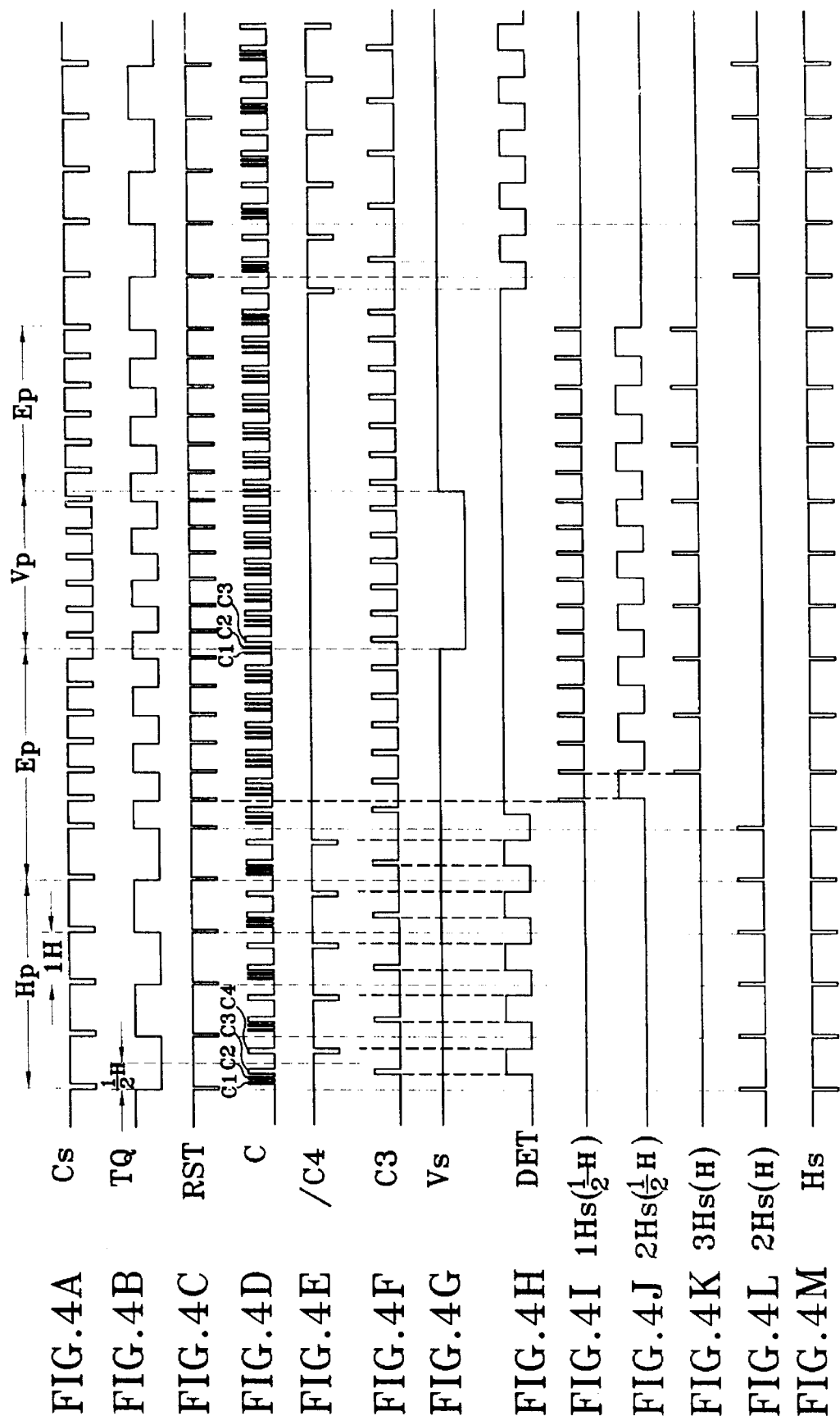

SYNCHRONOUS SIGNAL DETECTION CIRCUIT AND METHOD

BACK GROUND OF THE INVENTION

This invention relates to a liquid crystal display (LCD), and more particularly to a synchronous signal detection circuit for LCD capable of detecting vertical and horizontal synchronous signals from a composite synchronous signal with accuracy.

In general, vertical and horizontal synchronous signals is detected from a composite synchronous signal and displays video signals according to the detected vertical and horizontal synchronous signals on a LCD. In the prior, the vertical and horizontal synchronous signals have been detected from the composite synchronous signal by using a RC constant of a multivibrator. For example, as shown in FIG. 1A, the prior detection circuit generates trigger pulse at the rising and falling edges of an input pulse by using a delay means 11 and controls a bistable multivibrator 12 by the trigger pulse to detect the synchronous signals. The another detection circuit, as shown in FIG. 1B, drives the monostable multivibrator 14 by a rising trigger pulse generated from a delay means 13 to detect the synchronous signal having an adjustable pulse width. The another circuit, as shown in FIG. 1C, differentiates a rising trigger pulse from a monostable multivibrator 15 through a differential means 16 and then clips the differential pulse from the differential means 16 through a clipper 17 to detect the synchronous signal having a pulse width adjusted by the amplitude of the differential pulse and clipping level.

However, the above detection circuit has a disadvantage in that RC error is varied with an environment change such as temperature or a driving voltage, etc. and the delay time is varied, thereby varying the transition time. Furthermore, the prior detection circuit has a disadvantage in that the area for mounting and power consumption become large by using the RC element and multivibrator.

SUMMARY OF THE INVENTION

There is an object of the present invention to provide a synchronous signal detection circuit for LCD for detecting vertical and horizontal synchronous signals from a composite synchronous signal with accuracy with a digital logic construction.

There is another object of the present invention to provide a synchronous signal detection method for LCD for detecting vertical and horizontal synchronous signals from a composite synchronous signal with accuracy According to an aspect of the present invention, there is provided to a synchronous signal detection circuit which detect a vertical synchronous signal and a horizontal synchronous signal from composite synchronous signal, comprising: a reset generation means for receiving an external composite synchronous signal and an external main clock signal to generate a reset signal at falling edge of the composite synchronous signal; a counter means being reset by the reset signal received from the reset generation means and for counting the main clock signal to generate first through fourth output signals; a vertical synchronous signal detection means for receiving the second output signal of the counter means and the composite synchronous signal to detect the vertical synchronous signal of the composite synchronous signal and generating the vertical synchronous signal; and a horizontal synchronous signal detection means for receiving the third and the fourth output signals of the counter means and the reset signal of the reset generation means to detect the horizontal synchronous signal of composite synchronous signal having a period of 1 horizontal scanning interval (1H).

The reset generation means includes a flip flop for toggling the composite synchronous signal externally received; a second flip flop which receives an output signal of the first flip flop and the main clock signal as an input signal and a clock signal; and an exclusive NOR gate for logically operating output signals of the first and second flip flops to generate the reset signal at a falling edge of the composite synchronous signal.

The counter means includes a counter which is reset by the reset signal of the reset generation mean and counts the main clock signal; and a decoder for decoding output signals of the counter to generate the first through the fourth output signals. The counter means generates the first through the fourth output signals every 1H and the first through third output signals are generated within ½H and the fourth output signal is generated between ½H and 1H.

The vertical synchronous signal generation means includes a flip flop which receives the composite synchronous signal as an input signal and is triggered at a falling edge of the second output signal of the counter means to generate the vertical synchronous signal as an output signal.

The horizontal synchronous signal generation means includes an first detection means for receiving the third and fourth output signals of the output signals from the counter means to detect a ½H interval of the composite synchronous signal and generating a detection signal; a second detection means for receiving an inverted signal of the detection signal from the first detection means and an inverted signal of the reset signal from the reset generation means to detect the horizontal synchronous signal in a 1H interval of the composite synchronous signal; a third detection means for receiving the detection signal of the first detection means and the inverted signal of the reset signal from the reset generation means to generate the horizontal synchronous signal in a ½H interval of the composite synchronous signal; and an output means for receiving output signals from the second and third detection means to output the horizontal synchronous signal having 1H period of the composite synchronous signal.

The first detection means includes a flip flop which receives the third and fourth output signals of the counter portion as a set signal and a reset signal to detect the ½H interval of the composite synchronous signal and generates the detection signal as an output signal. The second detection means includes an AND gate for receiving the inverted signal of the detection signal from the first detection means and the inverted signal of the reset signal from the first detection means to detect the horizontal synchronous signal having a 1H period in the 1H interval of the composite synchronous signal.

The third detection means includes a first means for receiving the detection signal of the first detection means and the inverted signal of the reset signal of the reset generation means to detect a horizontal synchronous signal having a ½H period in the ½H interval of the composite synchronous signal; a second means for dividing an output signal of the first means by two; and a third means for receiving output signals of the first means and the second means to generate the horizontal synchronous signal having a 1H period in the ½H interval of the composite synchronous signal.

In the third detection means, the first means includes a first AND gate for receiving the detection signal of the first detection means and the inverted signal of the reset signal from the reset generation means to detect the horizontal synchronous signal having a ½H period in the ½H interval of the composite synchronous signal. The second means includes a flip flop which receives the output signal of the first AND gate and an inverted signal of the third output signal of the counter means as an input signal and a reset signal to divide the output signal of the first AND gate. The third means for receiving output signals of the first AND gate and the flip flop to generate the horizontal synchronous signal having a 1H period in the ½H interval of the composite synchronous signal.

The output means includes a NOR gate for logically operating the first horizontal synchronous signal having a 1H period detected at the 1H interval of the composite synchronous signal through the second detection means and the second horizontal synchronous signal having a 1H period detected at the ½H interval of the composite synchronous signal through the third detection, to generate the synchronous signal having a 1H period of the composite synchronous signal.

The synchronous signal detection circuit further comprises a horizontal synchronous signal generation means for receiving the horizontal synchronous signal detected through the horizontal synchronous signal detection means and the first output signal of the counter means to generate a horizontal synchronous signal having a varied duty ratio. The horizontal synchronous signal generation means includes a flip flop which receives the horizontal synchronous signal from the horizontal synchronous signal detection means and the reset signal from the reset generation means as a reset signal and a clock signal.

There is provided to a synchronous signal detection circuit which detect a vertical synchronous signal and a horizontal synchronous signal from composite synchronous signal, comprising: a reset generation means for receiving an external composite synchronous signal and an external main clock signal to generate a reset signal at falling edge of the composite synchronous signal; a counter means being reset by the reset signal received from the reset generation means and for counting the main clock signal to generate first through fourth output signals; a vertical synchronous signal detection means for receiving the second output signal of the counter means and the composite synchronous signal to detect the vertical synchronous signal of the composite synchronous signal and generating the vertical synchronous signal; and a horizontal synchronous signal detection means for receiving the third and the fourth output signals of the counter means and the reset signal of the reset generation means to detect the horizontal synchronous signal of the composite synchronous signal having a period of 1 horizontal scanning interval (1H), the means including an first detection means for receiving the third and fourth output signals of the output signals from the counter means to detect a ½H interval of the composite synchronous signal and generating a detection signal; a second detection means for receiving an inverted signal of the detection signal from the first detection means and an inverted signal of the reset signal from the reset generation means to detect the horizontal synchronous signal in a 1H interval of the composite synchronous signal; a third detection means for receiving the detection signal of the first detection means and the inverted signal of the reset signal from the reset generation means to generate the horizontal synchronous signal in a ½H interval of the composite synchronous signal; and an output means for receiving output signals from the second and third detection means to output the horizontal synchronous signal of the composite synchronous signal having a 1H period.

There is provided to a synchronous signal detection circuit which detect a vertical synchronous signal and a horizontal synchronous signal from composite synchronous signal, comprising: a reset generation means for receiving an external composite synchronous signal and an external main clock signal to generate a reset signal at falling edge of the composite synchronous signal; a counter means being reset by the reset signal received from the reset generation means and for counting the main clock signal to generate first through fourth output signals every 1H, the first through the third output signals being generated within ½ and the fourth output signal being generated between ½H and 1H; a vertical synchronous signal detection means for receiving the second output signal of the counter means and the composite synchronous signal to detect the vertical synchronous signal of the composite synchronous signal and generating the vertical synchronous signal; and a horizontal synchronous signal detection means for receiving the third and the fourth output signals of the counter means and the reset signal of the reset generation means to detect the horizontal synchronous signal of the composite synchronous signal having a period of 1 horizontal scanning interval (1H), the means including an first detection means for receiving the third and fourth output signals of the output signals from the counter means to detect a ½H interval of the composite synchronous signal to generate a detection signal; a second detection means for receiving an inverted signal of the detection signal from the first detection means and an inverted signal of the reset signal from the reset generation means to detect the horizontal synchronous signal having a 1H period in a 1H interval of the composite synchronous signal; a third detection means for receiving the detection signal of the first detection means and the inverted signal of the reset signal from the reset generation means to generate the horizontal synchronous signal having a ½H period in a ½H interval of the composite synchronous signal; a dividing means for dividing an output signal of the third detection means by two; and a generation means for receiving output signals of the second detection means and the dividing means to generate the horizontal synchronous signal having a 1H period in a ½H interval of the composite synchronous signal and an output means for receiving output signals from the second detection means and the generation means to output the horizontal synchronous signal of the composite synchronous signal having a 1H period; and a horizontal synchronous signal generation means for receiving the horizontal synchronous signal detected through the horizontal synchronous signal detection means and the first output signal of the counter means to generate a horizontal synchronous signal having a varied duty ratio.

According to an aspect of the present invention, there is provided to a method for detecting a vertical synchronous signal and a horizontal synchronous signal from an external composite synchronous signal, comprising the steps of: detecting a falling edge of the composite synchronous signal to generate a detection signals; generating first through fourth signals every 1 horizontal scanning interval (1H) by using the detection signal, the first through signal being generated within ½H and the fourth signal being generated between ½H and 1H; detecting the vertical synchronous signal from the composite synchronous signal by using the second signal; generating a horizontal synchronous signal having a ½H at a ½H interval of the composite synchronous signal by using the third and fourth signals; and detecting the horizontal synchronous signal having a ½H period by at one interval to generate the horizontal synchronous signal having a 1H period of the composite synchronous signal.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

FIG. 4A through FIG. 4M are timing diagrams of the detection circuit.

DETAILED DESCRIPTION OF THE PRESENT INVENTION

Figure 1A:
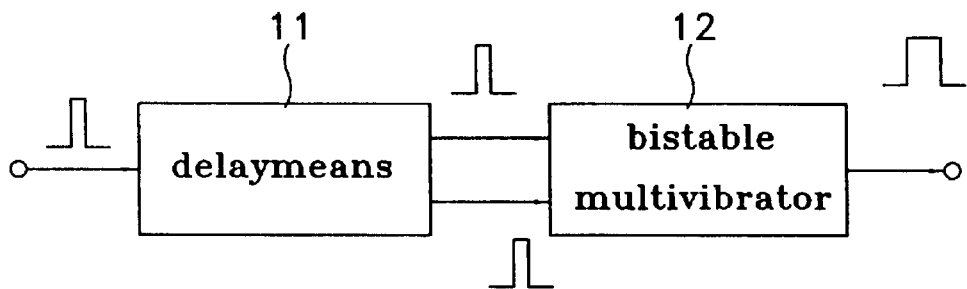
FIG. 1A through FIG. 1C are circuit diagrams of the prior synchronous signal detection circuits.
Figure 1B:
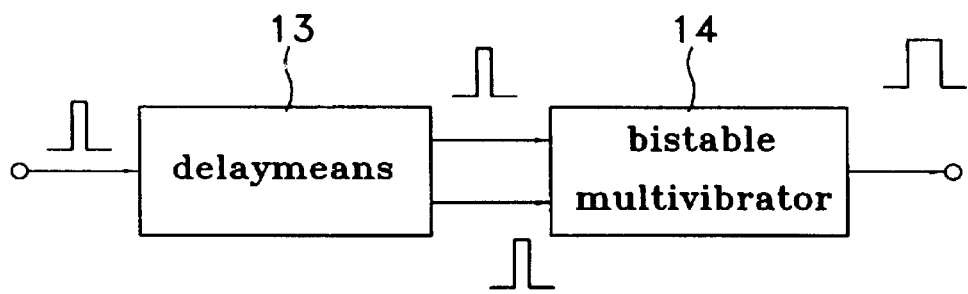
Figure 1C:
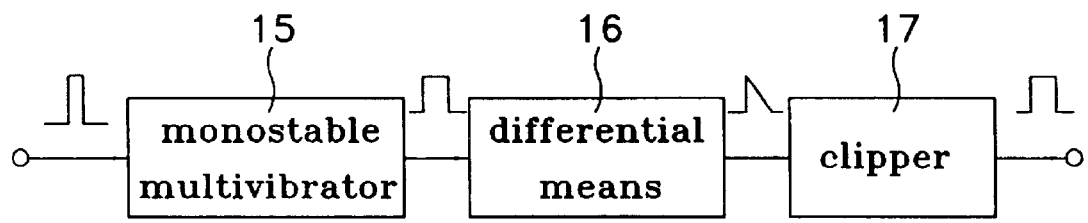
Figure 2:
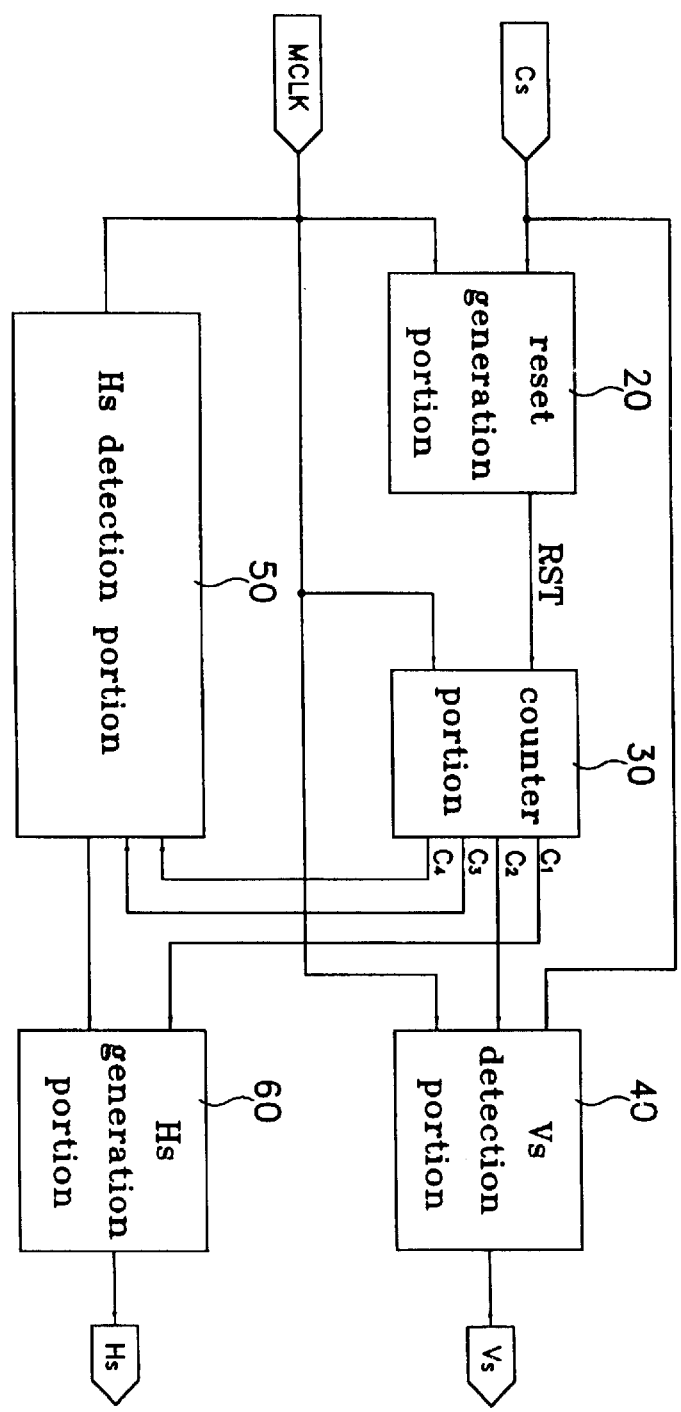
FIG. 2 is a block diagram of a synchronous signal detection circuit with an embodiment of the present invention.
Figure 3:
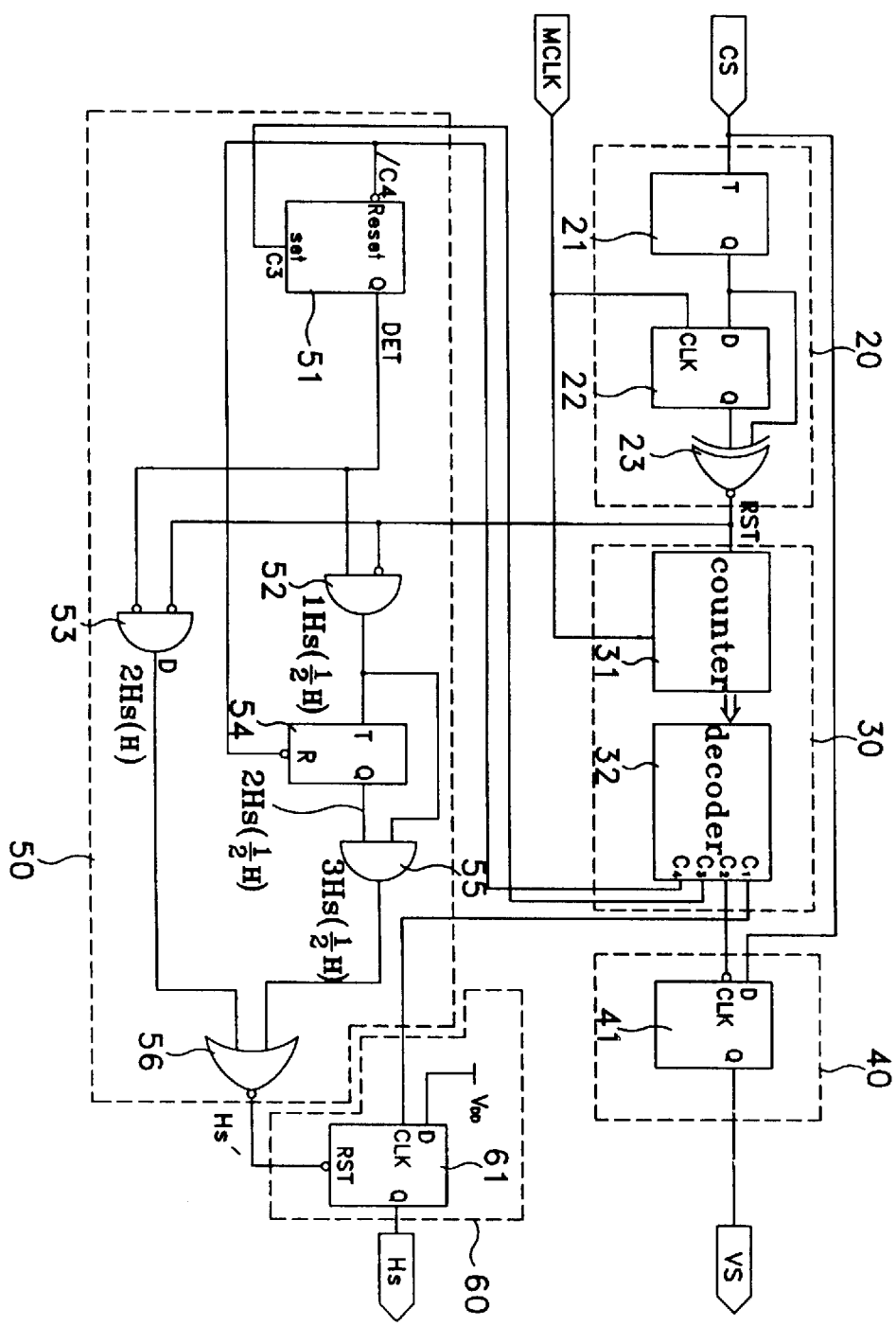
FIG. 3 is a detailed diagram of the synchronous signal detection circuit of FIG. 2.

FIG. 2 is a block diagram of a synchronous signal detection circuit with an embodiment of the present invention and FIG. 3 is a detailed circuit diagram of FIG. 2. The synchronous signal detection circuit includes a reset generation portion 20 for receiving an external composite synchronous signal Cs and an external main clock signal MCLK to generate a reset signal RST, a counter portion 30 which is reset by the reset signal received from the reset generation portion 20 and counts the main clock signal MCLK to generate first through fourth output signals C1–C4, a vertical synchronous signal detection means 40 for receiving the second output signal C2 of the counter portion 30 and the composite synchronous signal Cs to detect the vertical synchronous signal of the composite synchronous signal and generating the vertical synchronous signal Vs, a horizontal synchronous signal detection portion 50 for receiving the third and the fourth output signals C3 and C4 of the counter portion 30 and the reset signal RST of the reset generation portion 20 to detect the horizontal synchronous signal Hs' of composite synchronous signal having a period of 1 horizontal scanning interval (1H), and a horizontal synchronous signal generation portion 60 for receiving the horizontal synchronous signal is' from the horizontal synchronous signal detection portion 50 and the first output signal C1 of the counter portion 20 to generate the horizontal synchronous signal Hs having a varied duty ratio.

The reset generation portion 20 includes a first T flip flop 21 for toggling the composite synchronous signal Cs externally received, a first D flip flop 22 which receives an output signal of the first T flip flop 21 and the main clock signal MCLK as an input signal and a clock signal, and an exclusive NOR gate for logically operating output signals of the first T flip flop 21 and a first D flip flop 22 to generate the reset signal RST at a falling edge of the composite synchronous signal Cs.

The counter portion 30 includes a counter 31 which is reset by the reset signal RST of the reset generation portion 20 and counts the main clock signal MCLK, and a decoder for decoding output signals of the counter 31 to generate the first through the fourth output signals C1–C4. The counter portion 30 generates the first through the fourth output signals C1–C4 every 1H and the first through third output signals C1–C3 are generated within the ½H and the fourth output signal C4 is generated between ½H and 1H. The counter 31 is reset by the reset signal RST from the reset generation means 20 and then counts the main clock signal MCLK until the reset signal is applied again.

The vertical synchronous signal generation portion 40 includes a second flip flop 41 which receives the composite synchronous signal Cs as an input signal and is triggered at a falling edge of the second output signal C2 of the counter portion 30 to generate the vertical synchronous signal Vs as an output signal. The vertical synchronous signal generation portion 40 is triggered by the second output signal C2 of the output signals C1–C4 from the counter portion 30 to check the vertical pulse period VP of the composite signal Cs.

The horizontal synchronous signal generation portion 50 includes a third D flip flop 51 which receives the third and fourth output signals C3 and C4 of the output signals C1–C4 from the counter 31 as a detection means for receiving the third and fourth output signals C3 and C4 to detect a ½H interval of the composite synchronous signal Cs and generates a detection signal DET, a first AND gate 52 for receiving the detection signal from the flip flop 51 and an inverted signal of the reset signal RST from the reset generation portion 20 to detect the horizontal synchronous signal in a ½H interval of the composite synchronous signal Cs, a second AND gate 53 for receiving an inverted signal of the detection signal DET from the flip flop 51 and an inverted signal of the reset signal RST from the reset generation portion 20 to detect the horizontal synchronous signal in a 1H interval of the composite synchronous signal CS, a second T flip flop 54 for receives an output signal of the AND gate 52 and the third output signal C3 of the counter 31 to detect the horizontal synchronous signal in a vertical scanning interval of the composite synchronous signal Cs (That is, in a ½H interval of the composite synchronous signal Cs) and a NOR gate 56 for receiving output signals of the second and third AND gates 52 and 53 to generate the horizontal synchronous signal having a 1H period of the composite synchronous signal.

The horizontal synchronous signal generation portion 60 includes a fourth D flip flop which receives the horizontal synchronous signal Vs from the horizontal synchronous signal detection portion 50 and the reset signal RST from the reset generation portion as a reset signal and a clock signal. The horizontal synchronous signal detection portion 50 converts the composite synchronous signal Cs of ½H interval into the composite synchronous signal of 1H interval to generate the horizontal synchronous signal Hs' by using the third and fourth output signals C3 and C4 of the counter 31 capable of detecting the period variation of the composite synchronous signal Cs. The horizontal synchronous signal generation portion 60 generates the horizontal synchronous signal Hs where the duty ratio is varied by the first output signal C1 of the counter C1 and the output signal Hs', of the horizontal synchronous signal detection portion 50.

The operation of the synchronous signal detection circuit will be described in detail with reference to FIG. 4A through FIG. 4M. The reset generation portion receives the external composite synchronous signal Cs as shown in FIG. 4A as the input signal of the first T flip flop 21 and the T flip flop 21 generates the output signal TQ as shown in FIG. 4B toggled at the falling edge of the composite signal Cs. The first D flip flop 22 is triggered at the rising edge of the main clock signal MCLK to delay the output signal of the T flip flop 21. The exclusive NOR gate receives the output signals of the flip flops 21 and 22 to generate the reset signal RST at the level transition of the output signal TQ of the flip flop 22. The reset signal RST is provided to the counter 31 of the counter portion 30 and the inverted output signal of the reset signal RST is provided to the first and second AND gates 52 and 53. That is, as shown in FIG. 4C and FIG. 4D, the reset signal RST is generated at the falling edge of the composite synchronous signal Cs.

The counter 31 of the counter portion 30 is reset by the reset signal RST and then counts the main clock signal MLCK. The decoder 32 decodes the output signals of the counter 31 to generate the output signals C1–C4 as shown in FIG. 4D. The counter portion 30 generates the output signals every 1H through the decoder 32 and the first and third output signals C1–C3 are generated within ½H and the fourth output signal C4 is generated between ½H and 1H. Therefore, in the horizontal scanning interval HP of the composite synchronous signal Cs, pulses have a 1H period and in the vertical scanning interval of the equalization pulse EP and the vertical pulse VP, pulses have a ½H period and the fourth output signal C4 of the counter portion 30 is not generated.

Of the first through fourth output signals C1–C4 of the counter portion 30, the first output signal C1 and C2 are provided to the horizontal synchronous signal generation portion 60 and the vertical synchronous signal 40, respectively and the third and fourth output signals are horizontal synchronous signal detection portion 50. The vertical synchronous signal generation portion 40 and the horizontal synchronous signal generation portion 50 detect the vertical synchronous signal Vs and the horizontal synchronous signal Hs' from the composite synchronous signal Cs, respectively.

First, the vertical synchronous signal detection operation will be described. The second D flip flop 41 receives the second output signal C2 of the counter portion 30 and the composite synchronous signal as the clock signal and the input signal. Therefore, the second D flip flop 41 is triggered at the rising edge of the second output signal C2 to detect the vertical synchronous signal Vs as shown in FIG. 4G. That is, because the second D flip flop 41 is triggered by the second output signal C2 of the counter portion 30 to detect the phase inversion of the composition synchronous signal Cs (That is, the vertical pulse period VP) by the second output signal having the constant period and generates the vertical synchronous signal Vs as shown in FIG. 4G.

On the other hand, the horizontal synchronous signal detection operation will be described as follows. The third D flip flop 51 receives the third and fourth output signals C3 and C4 of the counter portion 30 as the set signal and the reset signal. The flip flop 51 is set at the rising edge of the third output signal C3 and is reset at the rising edge of the inverted signal /C4 of the fourth output signal C4 to detect the ½H interval of the composite synchronous signal Cs, thereby generating the detection signal DET.

In the horizontal scanning interval HP which is a 1H interval of the composite synchronous signal, the horizontal synchronous signal 1Hs (1H) having a 1H period is detected every 1H and in the vertical scanning interval of equalization pulse EP and vertical pulse VP which is a ½H interval of the composite synchronous signal, the horizontal synchronous signal 1Hs (½H) having a ½H period is detected every 1H. Therefore, the horizonal synchronous signal detection portion 50 detects the horizontal synchronous signal 1Hs (½H) detected in the ½H interval of the composite synchronous signal Cs at one interval by using the ½H interval detection signal DET, thereby the horizontal synchronous signal Hs' having a 1H period of the composite synchronous signal.

In other words, the first AND gate 52 receives the inverted signal of the reset signal RST and the detection signal DET of the third D flip flop 51 to detect the horizontal synchronous signal 1Hs (½H) in the ½H interval of the composite synchronous signal. At this time, horizontal synchronous signal 1Hs (½Hs) detected in the ½H interval of the composite synchronous signal Cs which is a vertical scanning interval, has a ½H period. The horizontal synchronous signal 1Hs (½Hs) is divided by two through the T flip flop 54. The AND gate 55 receives the output signal 2Hs (½Hs) of the T flip flop 54 and the output signal 1Hs (½Hs) of the first AND gate 52 and detects the horizontal synchronous signal 1Hs (½Hs) having a ½H period at one interval thereby generating the horizontal synchronous signal 3Hs (H) having a 1H period in the vertical scanning interval.

The second AND gate 52 logically operates the inverted signal of the detection signal DET of the third D flip 51 and the inverted signal of the reset signal RST to detect the horizontal synchronous signal 2Hs (H) having a 1H period in the 1H interval of the composite synchronous signal of the composite signal Cs which is a horizontal scanning interval HP. The NOR gate receives the horizontal synchronous signal 2Hs (H) in a 1H interval of the composite synchronous signal received from the second AND gate 52 and the horizontal synchronous signal 3Hs (½H) having a 1H period received from the third AND gate 55 to detect the horizontal synchronous signal Hs' having a 1H period from the composite synchronous signal Cs as shown in FIG. 4M.

The horizontal synchronous signal generation portion 60 receives the horizontal synchronous signal Hs' detected from the horizontal synchronous signal detection portion 50 as a reset signal RST of the fourth D flip flop 61. The D flip flop 61 is reset by the horizontal synchronous signal from the horizontal synchronous signal detection portion 50 and then triggered by the first output signal C1 of the counter portion 30 thereby generating the horizontal synchronous signal Hs having a predetermined pulse width which is a varied duty ratio.

Accordingly, the detection circuit of the present invention detects the falling edge of the composite synchronous signal Cs in the ½H interval to generate the vertical synchronous signal Vs and detects the horizontal synchronous signal having a ½ period in a ½H interval of the composite synchronous signal Cs which is a vertical scanning interval, thereby generating the horizontal synchronous signal having a 1H period.

According to the present invention, the detection circuit can detect the horizontal synchronous signal with accuracy as compared with the prior detection circuit. The detection circuit can be mounted inside a controller of LCD television, thereby reducing the power consumption and the PCB mounting area. The detection circuit does not limit to an embodiment and is applicable to divide the vertical synchronous signal and the horizontal synchronous signal from the broadcasting signal of NTSC, PAL, SECOM, etc.

The foregoing description shows only a preferred embodiment of the present invention. Various modifications are apparent to those skilled in the art without departing from the scope of the present invention which is only limited by the appended claims.

Therefore, the embodiment shown and described is only illustrative, not restrictive.

What is claimed is:

1. A synchronous signal detection circuit which detect a vertical synchronous signal and a horizontal synchronous signal from composite synchronous signal, comprising:

a reset generation means for receiving an external composite synchronous signal and an external main clock signal to generate a reset signal at falling edge of the composite synchronous signal;

a counter means being reset by the reset signal received from the reset generation means and for counting the main clock signal to generate first through fourth output signals;

a vertical synchronous signal detection means for receiving the second output signal of the counter means and the composite synchronous signal to detect the vertical synchronous signal of the composite synchronous signal and generating the vertical synchronous signal; and a horizontal synchronous signal detection means for receiving the third and the fourth output signals of the counter means and the reset signal of the reset generation means to detect the horizontal synchronous signal of composite synchronous signal having a period of 1 horizontal scanning interval (1H).

2. The synchronous signal detection circuit as claimed in claim 1, wherein the reset generation means includes:

a flip flop for toggling the composite synchronous signal externally received;

a second flip flop which receives an output signal of the first flip flop and the main clock signal as an input signal and a clock signal; and an exclusive NOR gate for logically operating output signals of the first and second flip flops to generate the reset signal at a falling edge of the composite synchronous signal.

3. The synchronous signal detection circuit as claimed in claim 1, wherein the counter means includes:

a counter which is reset by the reset signal of the reset generation mean and counts the main clock signal; and a decoder for decoding output signals of the counter to generate the first through the fourth output signals.

4. The synchronous signal detection circuit as claimed in claim 3, wherein the counter means generates the first through the fourth output signals every 1H and the first through third output signals are generated within the ½H and the fourth output signal is generated between ½H and 1H.

5. The synchronous signal detection circuit as claimed in claim 4, wherein the vertical synchronous signal generation means includes a flip flop which receives the composite synchronous signal as an input signal and is triggered at a falling edge of the second output signal of the counter means to generate the vertical synchronous signal as an output signal.

6. The synchronous signal detection circuit as claimed in claim 4, wherein the horizontal synchronous signal generation means includes:

an first detection means for receiving the third and fourth output signals of the output signals from the counter means to detect a ½H interval of the composite synchronous signal and generating a detection signal;

a second detection means for receiving an inverted signal of the detection signal from the first detection means and an inverted signal of the reset signal from the reset generation means to detect the horizontal synchronous signal in a 1H interval of the composite synchronous signal;

a third detection means for receiving the detection signal of the first detection means and the inverted signal of the reset signal from the reset generation means to generate the horizontal synchronous signal in a ½H interval of the composite synchronous signal; and an output means for receiving output signals from the second and third detection means to output the horizontal synchronous signal having 1H period of the composite synchronous signal.

7. The synchronous signal detection circuit as claimed in claim 6, wherein the first detection means includes a flip flop which receives the third and fourth output signals of the counter portion as a set signal and a reset signal to detect the ½H interval of the composite synchronous signal and generates the detection signal as an output signal.

8. The synchronous signal detection circuit as claimed in claim 6, wherein the second detection means includes an AND gate for receiving the inverted signal of the detection signal from the first detection means and the inverted signal of the reset signal from the first detection means to detect the horizontal synchronous signal having a 1H period in the 1H interval of the composite synchronous signal.

9. The synchronous signal detection circuit as claimed in claim 6, wherein the third detection means includes:

a first means for receiving the detection signal of the first detection means and the inverted signal of the reset signal of the reset generation means to detect a horizontal synchronous signal having a ½H period at the ½H interval of the composite synchronous signal;

a second means for dividing an output signal of the first means by two; and a third means for receiving output signals of the first means and the second means to generate the horizontal synchronous signal having a 1H period in the ½H interval of the composite synchronous signal.

10. The synchronous signal detection circuit as claimed in claim 9, wherein the first means includes a first AND gate for receiving the detection signal of the first detection means and the inverted signal of the reset signal from the reset generation means to detect the horizontal synchronous signal having a ½H period in the ½H interval of the composite synchronous signal.

11. The synchronous signal detection circuit as claimed in claim 10, wherein the second means includes a flip flop which receives the output signal of the first AND gate and an inverted signal of the third output signal of the counter portion as an input signal and a reset signal to divide the output signal of the first AND gate.

12. The synchronous signal detection circuit as claimed in claim 11, wherein the third means for receiving output signals of the first AND gate and the flip flop to generate the horizontal synchronous signal having a 1H period in the ½H interval of the composite synchronous signal.

13. The synchronous signal detection circuit as claimed in claim 6, wherein the output means includes a NOR gate for logically operating the horizontal synchronous signal having a 1H period detected in the 1H interval of the composite synchronous signal through the second detection means and the horizontal synchronous signal having a 1H period detected in the ½H interval of the composite synchronous signal through the third detection, to generate the synchronous signal having a 1H period of the composite synchronous signal.

14. The synchronous signal detection circuit as claimed in claim 1, further comprising a horizontal synchronous signal generation means for receiving the horizontal synchronous signal detected through the horizontal synchronous signal detection means and the first output signal of the counter means to generate a horizontal synchronous signal having a varied duty ratio.

15. The synchronous signal detection circuit as claimed in claim 14, wherein the horizontal synchronous signal generation means includes a flip flop which receives the horizontal synchronous signal from the horizontal synchronous signal detection means and the reset signal from the reset generation means as a reset signal and a clock signal.

16. A synchronous signal detection circuit which detect a vertical synchronous signal and a horizontal synchronous signal from composite synchronous signal, comprising:

a reset generation means for receiving an external composite synchronous signal and an external main clock signal to generate a reset signal at falling edge of the composite synchronous signal;

a counter means being reset by the reset signal received from the reset generation means and for counting the main clock signal to generate first through fourth output signals;

a vertical synchronous signal detection means for receiving the second output signal of the counter means and the composite synchronous signal to detect the vertical synchronous signal of the composite synchronous signal and generating the vertical synchronous signal; and a horizontal synchronous signal detection means for receiving the third and the fourth output signals of the counter means and the reset signal of the reset generation means to detect the horizontal synchronous signal of the composite synchronous signal having a period of 1 horizontal scanning interval (1H), the means including an first detection means for receiving the third and fourth output signals of the output signals from the counter means to detect a ½H interval of the composite synchronous signal and generating a detection signal; a second detection means for receiving an inverted signal of the detection signal from the first detection means and an inverted signal of the reset signal from the reset generation means to detect the horizontal synchronous signal in a 1H interval of the composite synchronous signal; a third detection means for receiving the detection signal of the first detection means and the inverted signal of the reset signal from the reset generation means to generate the horizontal synchronous signal in a ½H interval of the composite synchronous signal; and an output means for receiving output signals from the second and third detection means to output the horizontal synchronous signal of the composite synchronous signal having a 1H period.

17. The synchronous signal detection circuit as claimed in claim 16, wherein the counter means generates the first through the fourth output signals every 1H and the first through third output signals are generated within ½H and the fourth output signal is generated between ½H and 1H.

18. A synchronous signal detection circuit which detect a vertical synchronous signal and a horizontal synchronous signal from composite synchronous signal, comprising:

a reset generation means for receiving an external composite synchronous signal and an external main clock signal to generate a reset signal at falling edge of the composite synchronous signal;

a counter means being reset by the reset signal received from the reset generation means and for counting the main clock signal to generate first through fourth output signals every 1H, the first through the third output signals being generated within ½ and the fourth output signal being generated between ½H and 1H;

a vertical synchronous signal detection means for receiving the second output signal of the counter means and the composite synchronous signal to detect the vertical synchronous signal of the composite synchronous signal and generating the vertical synchronous signal;

a horizontal synchronous signal detection means for receiving the third and the fourth output signals of the counter means and the reset signal of the reset generation means to detect the horizontal synchronous signal of the composite synchronous signal having a period of 1 horizontal scanning interval (1H), the means including an first detection means for receiving the third and fourth output signals of the output signals from the counter means to detect a ½H interval of the composite synchronous signal to generate a detection signal; a second detection means for receiving an inverted signal of the detection signal from the first detection means and an inverted signal of the reset signal from the reset generation means to detect the horizontal synchronous signal having a 1H period in a 1H interval of the composite synchronous signal; a third detection means for receiving the detection signal of the first detection means and the inverted signal of the reset signal from the reset generation means to generate the horizontal synchronous signal having a ½H period in a ½H interval of the composite synchronous signal; a dividing means for dividing an output signal of the third detection means by two; and a generation means for receiving output signals of the second detection means and the dividing means to generate the horizontal synchronous signal having a 1H period of the composite synchronous signal and an output means for receiving output signals from the second detection means and the generation means to output the horizontal synchronous signal of the composite synchronous signal having a 1H period; and a horizontal synchronous signal generation means for receiving the horizontal synchronous signal detected through the horizontal synchronous signal detection means and the first output signal of the counter means to generate a horizontal synchronous signal having a varied duty ratio.

19. A method for detecting a vertical synchronous signal and a horizontal synchronous signal from an external composite synchronous signal, comprising the steps of:

detecting a falling edge of the composite synchronous signal to generate a detection signals;

generating first through fourth signals every 1 horizontal scanning interval (1H) by using the detection signal, the first through signal being generated within ½H and the fourth signal being generated between ½H and 1H;

detecting the vertical synchronous signal from the composite synchronous signal by using second signal;

generating a horizontal synchronous signal having a ½H period at a ½H interval of the composite synchronous signal by using the third and fourth signals; and detecting the horizontal synchronous signal having a ½H period by at one interval to generate the horizontal synchronous signal having a 1H period of the composite synchronous signal.

20. The synchronous signal detection method as claimed in claim 19, further comprising the step of generating a horizontal synchronous signal of 1H period where a duty ratio is varied by using the first signal, after horizontal synchronous signal detection.

* * * * *